(12) United States Patent
Bastide et al.

(10) Patent No.: US 10,764,398 B2
(45) Date of Patent: *Sep. 1, 2020

(54) RENDERING A PORTION OF AN IMAGE CORRESPONDING TO AN INTEREST OF A USER

(71) Applicant: International Business Machines Corporation, Armonk, NY (US)

(72) Inventors: Paul R. Bastide, Boxford, MA (US); Jonathan Dunne, Dungarvan (IE); Liam Harpur, Skerries (IE); Robert E. Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 15/810,135

(22) Filed: Nov. 13, 2017

(65) Prior Publication Data

US 2018/0124209 A1    May 3, 2018

Related U.S. Application Data

(63) Continuation of application No. 15/338,007, filed on Oct. 28, 2016.

(51) Int. Cl.
    *G06Q 50/00*    (2012.01)
    *G06F 16/9535*    (2019.01)
    (Continued)

(52) U.S. Cl.
    CPC ........... *H04L 67/327* (2013.01); *G06Q 50/01* (2013.01); *H04L 65/604* (2013.01); *H04L 67/22* (2013.01);
    (Continued)

(58) Field of Classification Search
    CPC ..... H04L 67/327; H04L 67/306; H04L 67/22; H04L 67/36; H04L 65/604; G06Q 50/01; G06F 16/9535
    (Continued)

(56) References Cited

U.S. PATENT DOCUMENTS 6,867,779 B1    3/2005  Doyle et al.
8,102,461 B2 *  1/2012  Choi ................. H04N 5/23212
                                               348/255

(Continued)

FOREIGN PATENT DOCUMENTS

WO    2005048132 A1    5/2005

OTHER PUBLICATIONS

IBM: List of IBM Patents or Patent Applications Treated as Related, 2 pg.

(Continued)

*Primary Examiner* — Emmanuel L Moise
*Assistant Examiner* — Xiang Yu
(74) *Attorney, Agent, or Firm* — Cuenot, Forsythe & Kim, LLC (57) ABSTRACT

At least one interest of a user by can be determined by analyzing information about the user. Initiation of communication of at least one image to a client device of the user can be detected. At least a first portion of a plurality of portions of the image that depicts a subject corresponding to the at least one interest of the user can be identified. Responsive to identifying the first portion of the image that depicts the subject corresponding to the at least one interest of the user, communication of the first portion of the image to the client device can be initiated before communication of other of the plurality of portions of the image to the client (Continued)

device is initiated, or without initiating communication of the other of the plurality of portions of the image to the client device.

13 Claims, 4 Drawing Sheets

(51) Int. Cl.
*H04L 29/08* (2006.01)
*H04L 29/06* (2006.01)

(52) U.S. Cl.
CPC ........ *H04L 67/306* (2013.01); *G06F 16/9535* (2019.01)

(58) Field of Classification Search
USPC ........................................................ 709/205
See application file for complete search history.

(56) References Cited

U.S. PATENT DOCUMENTS

| | | | | |
|---|---|---|---|---|
| 2004/0099741 A1* | 5/2004 | Dorai | ....................... | G06K 7/14 235/462.08 |
| 2004/0153436 A1* | 8/2004 | Pope | .................. | G06F 16/9535 |
| 2007/0276852 A1 | 11/2007 | Fletcher | | |
| 2008/0071877 A1 | 3/2008 | Beach | | |
| 2008/0150937 A1* | 6/2008 | Lundstrom | ........... | G06T 15/005 345/419 |
| 2009/0183085 A1* | 7/2009 | Pasetto | ................. | G06F 3/1431 715/744 |
| 2012/0319928 A1* | 12/2012 | Rhodes | ................ | G02B 27/017 345/8 |
| 2015/0206027 A1* | 7/2015 | Fisher | .................... | G06Q 30/02 382/225 |
| 2015/0269143 A1* | 9/2015 | Park | ........................ | G06F 16/54 382/305 |
| 2017/0147154 A1* | 5/2017 | Steiner | ................. | G06F 3/0481 |
| 2017/0193318 A1* | 7/2017 | Tumanov | ............... | G06T 7/149 |
| 2018/0124208 A1 | 5/2018 | Bastide et al. | | |

OTHER PUBLICATIONS

Bastide, P.R. et al., "Rendering a Portion of an Image Corresponding to an Interest of a User," U.S. Appl. No. 15/338,007, filed Oct. 28, 2016, 29 pages.

"Computer Vision," [online] Wikipedia, the Free Encyclopedia, Jul. 10, 2016, retrieved from the Internet: <hhttps://en.wikipedia.org/w/index.php?title=Computer_vision&oldid=729252421>, 4 pg.

Savage, N., "Seeing More Clearly," [online] Science, Communications of the ACM, Jan. 2016, vol. 59, No. 1, pp. 20-22.

* cited by examiner

Determine at least one interest of a user by analyzing information about the user
505

↓

Detect communication of at least one image to a client device of the user being initiated
510

↓

Identify at least a first portion of a plurality of portions of the image that depicts a subject corresponding to the at least one interest of the user
515

↓

Responsive to identifying the first portion of the image that depicts the subject corresponding to the at least one interest of the user, initiate communication of the first portion of the image to the client device before communication of other of the plurality of portions of the image to the client device is initiated, or without initiating communication of the other of the plurality of portions of the image to the client device
520

FIG. 5

RENDERING A PORTION OF AN IMAGE CORRESPONDING TO AN INTEREST OF A USER

BACKGROUND

The present invention relates to data processing systems, and more specifically, to image processing.

Advances in mobile devices and mobile networking over the past couple of decades have spurred the use of mobile devices, not only for telephonic communication, but also for various other forms of communication. Indeed, mobile devices now are commonly used to share images (e.g., still images and video content). For instance, a user may use a mobile device to capture one or more images, and share the image(s) with friends and family via social networking services, web based forums, text messaging, e-mail, etc. A user also may receive images from other people, and share the received images with various other contacts.

SUMMARY

A method includes determining, using a processor, at least one interest of a user by analyzing information about the user. The method also can include detecting communication of at least one image to a client device of the user being initiated. The method also can include identifying at least a first portion of a plurality of portions of the image that depicts a subject corresponding to the at least one interest of the user. The method also can include, responsive to identifying the first portion of the image that depicts the subject corresponding to the at least one interest of the user, initiating communication of the first portion of the image to the client device before communication of other of the plurality of portions of the image to the client device is initiated, or without initiating communication of the other of the plurality of portions of the image to the client device.

A system includes a processor programmed to initiate executable operations. The executable operations include determining at least one interest of a user by analyzing information about the user. The executable operations also can include detecting communication of at least one image to a client device of the user being initiated. The executable operations also can include identifying at least a first portion of a plurality of portions of the image that depicts a subject corresponding to the at least one interest of the user. The executable operations also can include, responsive to identifying the first portion of the image that depicts the subject corresponding to the at least one interest of the user, initiating communication of the first portion of the image to the client device before communication of other of the plurality of portions of the image to the client device is initiated, or without initiating communication of the other of the plurality of portions of the image to the client device.

A computer program includes a computer readable storage medium having program code stored thereon. The program code is executable by a processor to perform a method. The method includes determining, by the processor, at least one interest of a user by analyzing information about the user. The method also can include detecting, by the processor, communication of at least one image to a client device of the user being initiated. The method also can include identifying, by the processor, at least a first portion of a plurality of portions of the image that depicts a subject corresponding to the at least one interest of the user. The method also can include, responsive to identifying the first portion of the image that depicts the subject corresponding to the at least one interest of the user, initiating, by the processor, communication of the first portion of the image to the client device before communication of other of the plurality of portions of the image to the client device is initiated, or without initiating communication of the other of the plurality of portions of the image to the client device.

DETAILED DESCRIPTION

This disclosure relates to data processing systems, and more specifically, to image processing. In accordance with the inventive arrangements disclosed herein, a data processing system can process an image communicated to a user to separate the image into respective portions, and initiate communication to the user of a portion of the image depicting a subject of interest to the user prior to communication of other portions of the image being initiated, or without initiating communication of the other portions. This can expedite communication of the portion of the image that is of interest to the user, for example if the network bandwidth available to the user's client device is low. In a further arrangement, the data processing system can apply an image processing effect to the image, for example to crop the image around the identified portion or to zoom in on a portion depicting a subject that is of interest to the user. This can mitigate additional user inputs that the user otherwise may enter to zoom in on her depiction.

Several definitions that apply throughout this document now will be presented.

As defined herein, the term "image" means an artifact that depicts visual perception. An example of an image is a still image produced by a camera. Another example of an image is a video frame of video content produced by a camera recording the video content. Another example of an image is picture produced by an artist.

As defined herein, the term "intelligent focal point," which may be referred to by the acronym "iFoci," means a focal point dynamically determined for a subject depicted in an image based on a type of the subject. For example, if the subject is a face, image processing can be used to determine the intelligent focal point to start at a center of the face and extend outward from the center of the face to sides of the face, a top of the face and a bottom of the face.

As defined herein, the term "client device" means a processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "social networking service" means an online service platform on which social networks or social relations are built among people who, for example, share interests, activities, backgrounds or real-life connections, and via which people can share information with one another. People can hold conversations in a social networking service by posting messages. As the term "social networking service" is defined herein, a messaging service per se (e.g., an e-mail service or a text messaging service) is not a social networking service, though a social networking service can include an e-mail messaging service, a text messaging service in addition to one or more social networking components.

As defined herein, the term "web based forum" means is an online discussion site where people can post messages that are viewable by other people. For example, people can hold conversations in a web based forum by posting messages. Some messages posted in a web based forum may be responses to other posted messages, or ask questions related to other posted messages. As the term "web based forum" is defined herein, a messaging service per se (e.g., an e-mail service or a text messaging service) is not a web based forum, though a web based forum can include an e-mail messaging service and/or a text messaging service in addition to one or more web based forum components.

As defined herein, the term "post" means to enter a message in a thread of a social networking service or a web based forum. A new thread can be created in which to enter the message, or the message can be entered into an existing thread.

As defined herein, the term "e-mail" means an electronic mail delivered via a communication network to at least one user. An e-mail may be sent by one user to one or more other users. In this regard, an e-mail typically identifies at least recipient using a user name (e.g., e-mail address) corresponding to the recipient, or a group name corresponding to a group of recipients, in at least field within the e-mail, for example within a "To" field, "Cc" field and/or "Bcc" field in a header of the e-mail. A recipient may view an e-mail via an e-mail client, which may execute on a client device or a server to which a client device is communicatively linked.

As defined herein, the term "text message" means an electronic message comprising text delivered via a communication network to at least one user identified as a recipient. A text message may be sent by one user to one or more other users. In this regard, a text message typically identifies at least one recipient using a user name, user identifier, telephone number or the like. A text message also may comprise audio, image and/or video content. A text message can be delivered, for example, using the short message service (SMS), the text messaging service (TMS) and/or the multimedia messaging service (MMS). A text message also may be referred to as an "instant message." As defined herein, a text message itself is not a result generated by an Internet search engine per se, although a text message may contain one or more uniform resource identifiers, such as hyperlinks, which can be generated by an Internet search engine and copied, for example by a user (e.g., sender), into the text message. In this regard, if a user uses a web browser to access an Internet search engine to perform an Internet search, and the user receives results from the Internet search engine in the web browser, such results are not a text message as the term text message is defined herein.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 1:
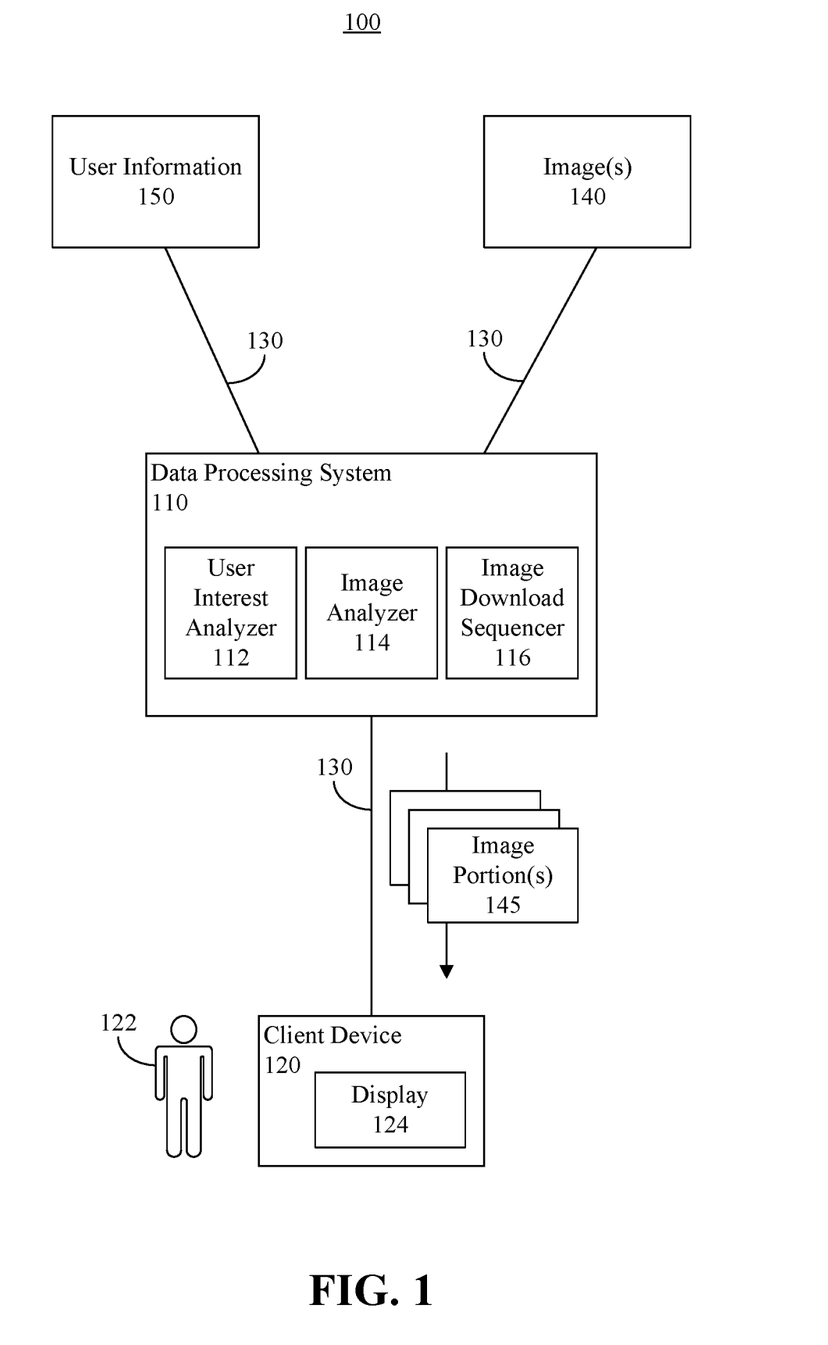
FIG. 1 is a block diagram illustrating an example of a network computing environment.

FIG. 1 is a block diagram illustrating an example of a network computing environment 100. The network computing environment 100 can include a data processing system 110 including at least one processor and memory. For example, the data processing system 110 can be implemented as one or more hardware servers. The data processing system 110 can include a user interest analyzer 112, an image analyzer 114 and an image download sequencer 116, which will be described herein.

The network computing environment 100 also can include at least one client device 120 used by a user 122. In one arrangement, the client device can include a display 124. In another arrangement, the client device 120 can be communicatively linked to the display 124. On the display 124 the client device 120 can present a user interface via which the user 122 interacts with the client device 120, for example to view images.

The data processing system 110 can be communicatively linked to the client device 120 and various other processing systems via at least one communication network 130. The communication network 130 is the medium used to provide communications links between various devices and data processing systems connected together within the network computing environment 100. The communication network 130 may include connections, such as wire, wireless communication links, or fiber optic cables. The communication network 130 can be implemented as, or include, any of a variety of different communication technologies such as a wide area network (WAN), a local area network (LAN), a wireless network, a mobile network, a virtual private network (VPN), the Internet, the Public Switched Telephone Network (PSTN), or other networking technologies.

In operation, the user interest analyzer 112 can automatically determine at least one interest of the user 122 by analyzing user information 150 about the user 122. The user information 150 can include, for example, one or more user profiles of the user, social networking data of the user 122, collaboration data of the user 122, and so on. In illustration, the user 122 may have a user profile in each of the social networking services and/or web based forums in which the user 122 participates. Such user profiles can include user profile data indicating various interests of the user 122, and can be communicated to and/or accessed by the user interest analyzer 112.

Further, a social networking service used by the user 122 can monitor and track social networking data pertaining to posts which the user 122 selects to view, discussion groups in which the user 122 participates, etc. If the user 122 frequently selects posts pertaining to cars, or participates in car discussion groups, the social networking data can indicate that the user 122 has an interest in cars. The social networking service can communicate such social networking data to the user interest analyzer 112. Similarly, a web based forum used by the user 122 can monitor and track collaboration data pertaining to posts which the user 122 selects to view, discussion groups in which the user 122 participates, etc. Again, if the user 122 frequently selects posts pertaining to cars, or participates in car discussion groups, the collaboration data can indicate that the user 122 has an interest in cars. The web based forum can communicate such collaboration data to the user interest analyzer 112. Further, a social networking service or web based forum used by the user 122 can identify tags for comments and/or areas of discussion popular among friends, family and/or other contacts of the user, and the social networking data or collaboration data communicated to the user interest analyzer 112 can indicate such tags as being of interest to the user 122.

A text messaging system and/or e-mail system used by the user 122 also can monitor and track collaboration data for the user 122, and communicate the collaboration data to the user interest analyzer 112. For example, if the user 122 frequently sends and/or receives text messages and/or e-mails discussing architecture, the collaboration data can indicate that the user 122 has an interest in architecture.

In one non-limiting arrangement, the data processing system 110 can maintain a user profile for the user 122. In that user profile, the user interest analyzer 112 can include data indicating the various interests of the user 122 that have been identified, for example as previously described. Further, the user interest analyzer 112 can rank the interests of the user 122 based on the user information 150. For example, if the user information 150 indicates that the user 122 selects to enlarge a render of 90% of images depicting landscapes, the user 122 selects to enlarge a render of 75% of images depicting street views, and the user 122 selects to enlarge a render of 60% of images depicting portraits, the user interest analyzer 112 can rank landscapes as having the highest level user interest, rank street views as having a second highest level of user interest, and rank portraits as having a third highest level of user interest.

The user interest analyzer 112 can periodically update the user profile based on analyzing the user information 150 received from the text messaging server, e-mail server, social networking service(s) and/or web based forum(s). For example, the user interest analyzer 112 can update the user profile every hour, every three hours, every six hours, every twelve hours, every day, or so on. Thus, the user interest analyzer 112 need not perform such analysis each time an image 140 is communicated to the user 122. Instead, the user interest analyzer 112 can access the user profile maintained by the data processing system 110 to determine one or more interests of the user responsive to the data processing system 110 detecting communication of an image 140 to the user 122 being initiated.

Continuing on, the data processing system 110 can automatically detect initiation of communication of at least one image 140, for example a still image or video content, to the client device 120. For example, the data processing system 110 can detect communication to the user 122 of the client device 120 of a text message or e-mail including at least one image 140. In illustration, the data processing system 110 can host, or be communicatively linked to, a text messaging server and/or an e-mail server through which text messages and/or e-mails communicated to the user 122 are routed. Responsive to any such server detecting a text message or e-mail including at least one image 140 being communicated to the user 122, such server can communicate the image 140 (or the entire text message or e-mail) to the image analyzer 114 for further processing.

In another example, the data processing system 110 can automatically detect communication of one or more images 140 from one or more social networking services and/or web based forums to the user 122 of the client device 120. For example, the data processing system 110 can host, or be communicatively linked to, one or more social networking services and/or web based forums via which the user 122 interacts with other users. Such interactions can include receiving images 140 posted by other users and shared with the user 122 in the social networking service(s) and/or web based forum(s). Responsive to a social networking service and/or web based forum detecting at least one image 140 being shared with the user 122, the social networking service and/or web based forum can communicate the image 140 to the image analyzer 114 for further processing.

Responsive to the data processing system 110 detecting communication of an image 140 to the user 122 being initiated, the image analyzer 114 can implement image recognition, which is known to those of ordinary skill in the art, on the image 140 to determine whether the image 140 depicts at least one subject that corresponds to at least one interest of the user 122. If so, the image analyzer 114 can automatically identify at least one portion 145 of the image 140 that depicts the subject corresponding to the interest of the user 122. For example, if the user 122 has an interest in cars, and the image 140 includes a depiction of a car, the image analyzer 114 can identify the portion 145 of the image 140 that includes the depiction of the car. In a another example, if the user has an interest in architecture, and the image 140 includes a depiction of an architectural structure, such as a building, bridge, etc., the image analyzer 114 can identify the portion 145 of the image 140 that includes the architectural structure.

In further example, it can be presumed that the user 122 has an interest in himself. Thus, if the image includes a depiction of the user 122, the image analyzer 114 can identify the portion 145 of the image 140 that includes the depiction of the user 122 by comparing the image 140 to another image of the user 122, such as an image of the user 122 contained in the user profile of the user 122. In another arrangement, the image analyzer 114 can, a priori, analyze another image of the user 122 and store data resulting from such analysis in the user profile of the user 122, or otherwise associate such data with the user profile.

In some cases, an image 140 may depict a plurality of subjects that are of interest to the user 122. In such cases, the image analyzer 114 can identify the subject corresponding to the highest ranked interest of the user 122, for instance as indicated by the user profile of the user 122, and identify the portion 145 of the image 140 that includes that subject.

Responsive to identifying the portion 145 of the image 140 that depicts the subject corresponding to the interest of the user 122, in one arrangement, the data processing system 110 can automatically initiate communication of that portion 145 of the image 140 to the client device 120 without initiating communication of other portions of the image 140 to the client device 120. In another arrangement, the data processing system 110 can automatically initiate communication to the client device 120 the portion 145 of the image 140 that depicts the subject corresponding to the interest of the user 122 before communication of other portions 145 of the image 140 to the client device 120 is initiated.

In illustration, the image analyzer 114 can slice the image 140 into multiple image portions 145, at least one of which depicts the subject that corresponds to an interest of the user 122, and assign a respective communication priority to each of the image portions 145. The portion 145 of the image 140 (first portion) depicting the subject corresponding to the interest of the user 122 can be assigned a highest level of priority. Portions 145 of the image 140 (second portions) that abut the first portion can be assigned next highest levels of priority, for example in a sequential order, portions 145 of the image 140 that abut the second portion can be assigned levels of priority lower than those assigned to the second portions, and so on. The image download sequencer 116 can sequence the respective portions 145 of the image 140 for download to the client device 120 in the order of the assigned priorities, with the first portion being sequenced to download first, followed by the second portions 145, then followed by the third portions 145, and so on.

By way of example, if the image is an attachment to a text message or e-mail, the image download sequencer 116 can communicate the sequenced portions 145 of the image 140 to the respective text messaging server or e-mail server, which can be configured to communicate the portions 145 of the image 140 in accordance with the assigned sequence. In illustration, the e-mail server can be configured to communicate an e-mail having the image 140 as an attachment by initially communicating a header, footer and body of the e-mail with a place holder for the attached image 140. After communicating the header, footer and body, in real time, the e-mail server can communicate the first portion of the image 140. Moreover, the e-mail server can configure the first portion of the image 140 to be available to be rendered on the display 124 once the first portion of the image 140 is received by the client device 120. After communicating the first portion of the image 140, the e-mail server can, in real time, communicate a portion having a second highest level priority then, in real time, communicate a next portion have third highest level of priority, and so on. The attachment can be configured to add to the render of the image 140 each portion of the image 140 as the respective portions 145 are received. Text messages having images 140 as attachments can be communicated to the client device 120 in a similar manner.

In the case that the image 140 is shared with the user 122 in a social networking service or web based forum, the image download sequencer 116 can communicate the sequenced portions 145 of the image 140 to the respective social networking service or web based forum, which can be configured to communicate the portions 145 of the image 140 in accordance with the assigned sequence. In illustration, the social networking service can be configured to communicate a post including the image 140 by initially communicating the post with a placeholder for the image 140. After communicating the post, in real time, the social networking service can communicate the first portion of the image 140. Moreover, the social networking service can configure the first portion of the image 140 to be available to be rendered on the display 124 once the first portion of the image 140 is received by the client device 120. After communicating the first portion of the image 140, the social networking service can, in real time, communicate a portion having a second highest level priority then, in real time, communicate a next portion have third highest level of priority, and so on. The post can be configured to add to the render of the image 140 each portion of the image 140 as the respective portions 145 are received. Posts in web based forums that include images 140 can be communicated to the client device 120 in a similar manner.

In an arrangement in which the text messaging server e-mail server, social networking service and/or web based forum is/are hosted by the data processing system 110, initiating communication of one or more portions 145 of the image 140 to the client device 120 can include the data processing system 110 communicating the one or more portions 145 of the image 140 to the client device 120.

In one aspect of the present arrangements, the processes of identifying at least a first portion of a plurality of portions 145 of the image that depicts a subject corresponding to the at least one interest of the user and initiating communication of the first portion 145 of the image 140 to the client device before communication of other of the plurality of portions 145 of the image to the client device is initiated, or without initiating communication of the other of the plurality of portions 145 of the image to the client device, can be implemented responsive to the data processing system 110 determining that a level of network bandwidth available to communicate the image(s) 140 to the client device is below a threshold value. In illustration, the data processing system 110 can monitor network connectivity of the client device 120 to the communication network 130 and determine the level of network bandwidth available to communicate the image(s) 140 to the client device 120. For instance, if the client device 120 is connected to a mobile network and is located in a region where low network bandwidth (e.g., below a threshold value) is available, for example due to low signal strength, the data processing system 110 can initiate communication of the first portion 145 of the image 140 to the client device 120 before communication of other portions 145 of the image 140 to the client device 120 is initiated, or without initiating communication of the other portions 145 of the image 145 to the client device 120. If, however, the client device 120 is connected to a mobile network or WiFi™ network providing a level of network bandwidth that meets or exceeds the threshold value, the image(s) 140 can be communicated to the client device 120 without separating the image(s) 140 into portions 145.

In another aspect of the present arrangements, the data processing system 110 can apply one or more image processing effects on images 140 communicated to the client device 120 based on determined image interaction behavior of the user 122. In illustration, the client device 120 can monitor and track image interaction behavior of the user 122 with images received by the client device 120. For example, if, when receiving an image 140 containing a depiction of the user 122, the user 122 typically zooms in on the depiction of the user 122, or crops the image 140 around the depiction of the user 122, the client device 120 can identify such circumstances and generate corresponding user information 150. The client device 120 can communicate such user information 150 to the data processing system 110, which the data processing system 110 can add to, or associate with, the user profile of the user 122.

Responsive to communication of a new image 140 to the client device 120 being initiated, and responsive to the image analyzer 114 determining that the new image 140 contains subject corresponding to at least one interest of the user, for instance a depiction of the user 122, the image analyzer 114 can apply an image processing effect to the new image 140 based on the determined image interaction behavior of the user. Such image processing effect can include, for example, cropping the image 140 around the portion of the image that depicts the subject corresponding to the at least one interest of the user, or zooming in on the portion of the image that depicts the subject corresponding to the at least one interest of the user. Accordingly, the new image 140 can be rendered on the display 124 of the client device 120 with the image processing effect(s) already applied to the image 140, thus saving the user 122 time that the user 122 otherwise may spend to apply the image processing effect(s) himself.

Figure 2:
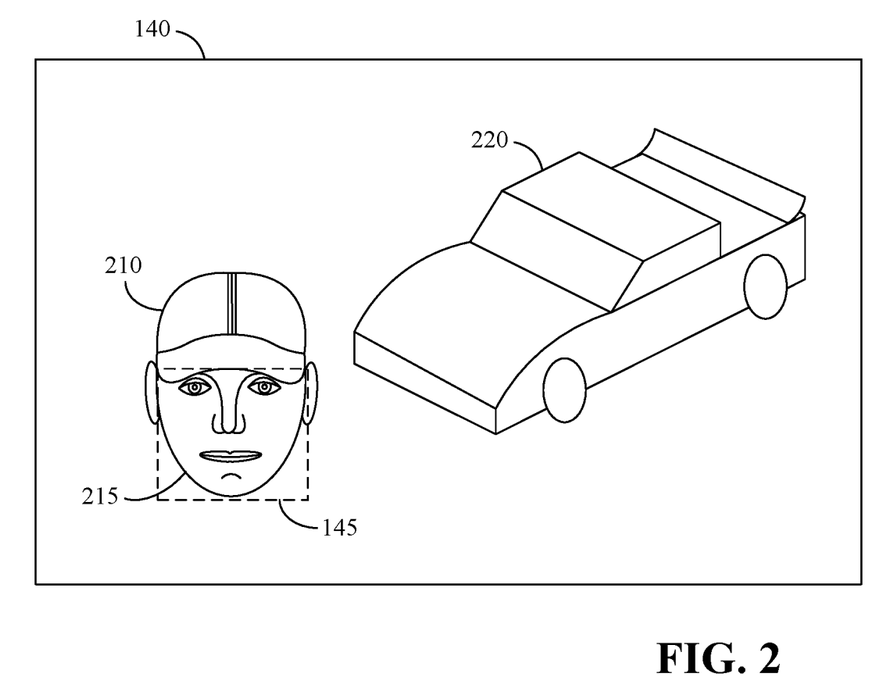
FIG. 2 depicts an example of image.

FIG. 2 depicts an example of an image 140. In this example, assume the image 140 depicts subjects 210, 220, the subject 210 is the user 122 and the subject 220 is a car. Also assume that the user profile of the user 122 indicates that the subject 210 has the highest level of interest to the user 122 (e.g., oftentimes when viewing images depicting users, the users will first look at their own face in the image before viewing other regions of the images). Accordingly, the image analyzer 114 can identify a portion 145 of the image 140 depicting the subject 210. Moreover, because facial features are typically the first features users look at them when viewing an image of a person, and the subject 210 is a person, the image analyzer 114 can define the portion 145 to include facial features 215 of the subject 210, including the subject's eyes, nose, mouth, cheeks, chin, etc., while not necessarily including other features of the subject 210.

In this regard, the image analyzer 114 can be configured to dynamically define intelligent focal points (iFoci) for various types of subjects, and use the intelligent focal points to define portions 145 of images 140. In illustration, parameters used to define intelligent focal points can be specified for various types of subjects, for example in a data table. The image analyzer 114 can be configured to correlate a subject depicted in an image 140 with a particular subject type using known image processing techniques, select parameters for that subject type to be used to define the intelligent focal point for the subject, and define the intelligent focal point using such parameters.

Figure 3:
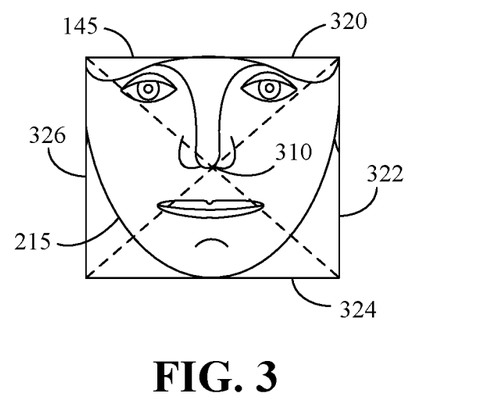
FIG. 3 depicts an example of a portion of the image of FIG. 2.

In illustration, referring to FIG. 3, for depictions of people the image analyzer 114 can dynamically define an intelligent focal point, to start at a center 310 of the face and extend outward from the center to sides of the face (e.g., cheeks), a top of the face (e.g., forehead) and a bottom of the face (e.g., chin). For example, the image analyzer 114 specify that the portion 145 of an image 140 depicting the person is to include the center of the portion 145, and specify that edges 320, 322, 324, 326 of the portion 145 are to frame the facial features 215. Accordingly, the portion 145 of the image 140 depicting the facial features of the subject 210 can be communicated to the user prior to other portions of the image being communicated, thereby providing the user an opportunity to quickly determine whether he likes the way he looks in the image before other regions of the image are even received.

The image analyzer 114 also can dynamically define various other intelligent focal points for different types of subjects. For example, if a subject in an image 140 that is identified as being of interest to a user is a landscape, the image analyzer 114 can specify the intelligent focal point for a portion 145 of the image 140 containing the landscape to begin at a center of the landscape, and extend outward from the center. For instance, the image analyzer 114 can specify edges of the portion of the image to extend a certain distance from the center of the landscape. If the subject of interest is a street view, the image analyzer can specify the intelligent focal point to begin at a bottom of the street view, extend from a bottom edge of the portion 145 at the bottom of the street view to a top edge of the portion 145 at a certain distance above a top of the street view, and extend a certain distance from sides of the street view. Still, other intelligent focal points can be defined for other types of subjects, and the present arrangements are not limited in this regard.

Figure 4:
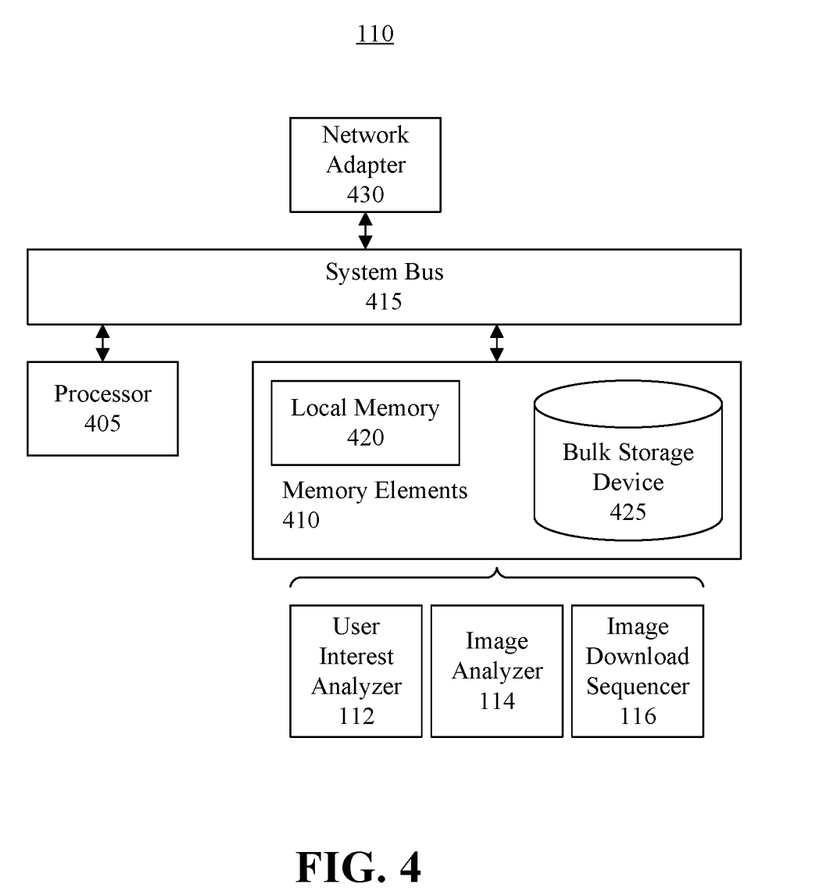
FIG. 4 is a block diagram illustrating example architecture for a data processing system.

FIG. 4 is a block diagram illustrating example architecture for the data processing system 110 of FIG. 1. The data processing system 110 can include at least one processor 405 (e.g., a central processing unit) coupled to memory elements 410 through a system bus 415 or other suitable circuitry. As such, the data processing system 110 can store program code within the memory elements 410. The processor 405 can execute the program code accessed from the memory elements 410 via the system bus 415. It should be appreciated that the data processing system 110 can be implemented in the form of any system including a processor and memory that is capable of performing the functions and/or operations described within this specification. For example, the data processing system 110 can be implemented as a server, a plurality of communicatively linked servers, or in any other suitable manner.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The data processing system 110 also can include one or more cache memories (not shown) that provide temporary storage of at least some program code in order to reduce the number of times program code must be retrieved from the bulk storage device 425 during execution.

One or more network adapters 430 can be coupled to data processing system 110 to enable the data processing system 110 to become coupled to other systems, computer systems, remote printers, and/or remote storage devices through intervening private or public networks. Modems, cable modems, transceivers, and Ethernet cards are examples of different types of network adapters 430 that can be used with the data processing system 110.

As pictured in FIG. 4, the memory elements 410 can store the components of the data processing system 110, namely the user interest analyzer 112, the image analyzer 114 and the image download sequencer 116. Being implemented in the form of executable program code, these components of the data processing system 110 can be executed by the processor 405 of the data processing system 110, for example within a computing environment hosted by an operating system of the data processing system 110. As such, the user interest analyzer 112, the image analyzer 114 and the image download sequencer 116 can be considered part of the data processing system 110. Moreover, the user interest analyzer 112, the image analyzer 114 and the image download sequencer 116 are functional data structures that impart functionality when employed as part of the data processing system 110. Moreover, images processed by the data processing system 110 and user profiles accessed by the data processing system 110 are functional data structures that impart functionality when processed by the data processing system 110.

Figure 5:
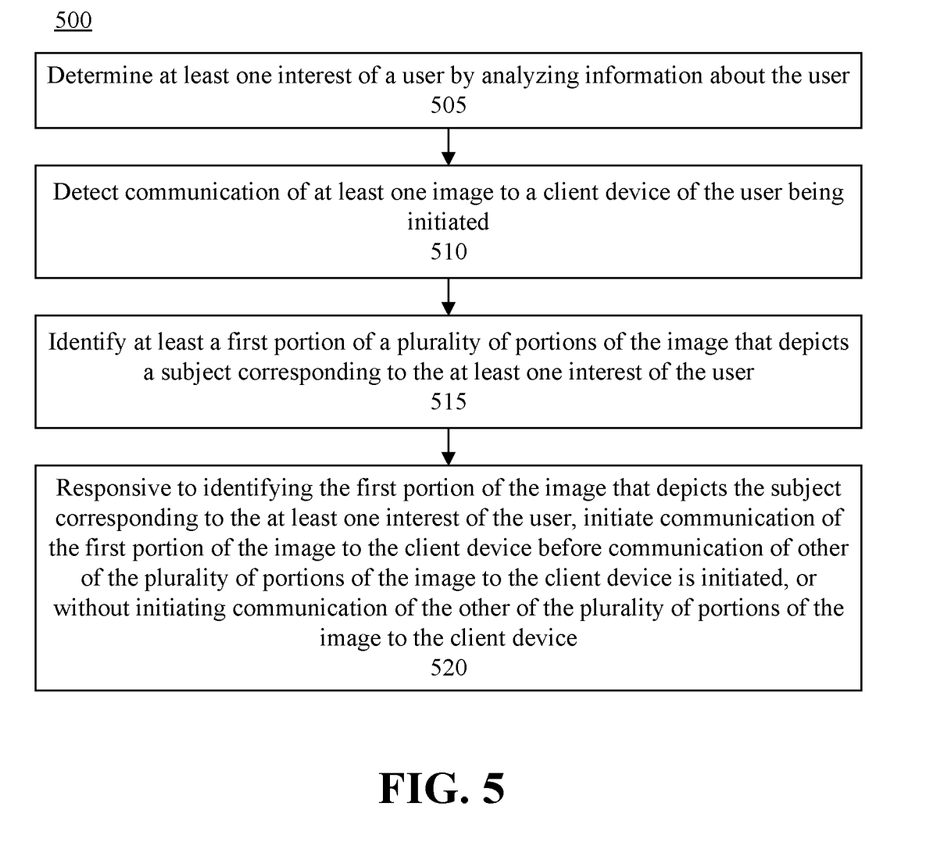
FIG. 5 is a flow chart illustrating an example of a method of selectively communicating a portion of an image to a client device.

FIG. 5 is a flow chart illustrating an example of a method 500 of selectively communicating a portion of an image to a client device. At step 505, the data processing system 110 can determine at least one interest of a user by analyzing information about the user. At step 510, the data processing system 110 can detect communication of at least one image to a client device of the user being initiated. At step 515, the data processing system 110 can identify at least a first portion of a plurality of portions of the image that depicts a subject corresponding to the at least one interest of the user. At step 520, the data processing system 110 can, responsive to identifying the first portion of the image that depicts the subject corresponding to the at least one interest of the user, initiate communication of the first portion of the image to the client device before communication of other of the plurality of portions of the image to the client device is initiated, or without initiating communication of the other of the plurality of portions of the image to the client device. For example, in one arrangement, the data processing system 110 can assign a respective communication priority to each of the plurality of portions of the image and initiate communication of each of the plurality of portions of the image in an order determined by the respective communication priority assigned to each of the plurality of portions of the image.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

determining, using a processor, at least a first type of subject that is an interest of a user by analyzing information about the user, the information about the user comprising data pertaining to at least a first plurality of images depicting the first type of subject and for which the user has enlarged renderings of the images;

detecting communication of at least one other image to a client device of the user being initiated;

responsive to the detecting communication of the at least one other image to the client device of the user being initiated, identifying at least a first portion, of a plurality of portions of the other image, that depicts the first type of subject that is the interest of the user; and responsive to identifying the first portion of the other image that depicts the first type of subject corresponding to the at least one interest of the user, initiating communication of the first portion of the other image to the client device before communication of other portions of the other image to the client device is initiated, or without initiating communication of the other portions of the other image to the client device; and determining a first percentage of the first plurality of images, pertaining to the first type of subject, for which the user has enlarged the renderings of the images;

determining a second percentage of a second plurality of images, pertaining to a second type of subject, for which the user has enlarged renderings of the images; and ranking the first type of subject and the second type of subject based on the first percentage of the first plurality of images and the second percentage of the second plurality of images.

2. The method of claim 1, further comprising:
assigning a respective communication priority to each of the plurality of portions of the other image; and
initiating communication of each of the plurality of portions of the other image in an order determined by the respective communication priority assigned to each of the plurality of portions of the other image.

3. The method of claim 1, further comprising:
determining a level of network bandwidth available to communicate the at least one other image to the user of the client device;
wherein the initiating communication of the first portion of the other image to the client device before communication of other portions of the other image to the client device is initiated further is responsive to the level of the network bandwidth being below a threshold value, or the initiating communication of the first portion of the other image to the client device without initiating communication of the other portions of the other image to the client device further is responsive to the level of the network bandwidth being below a threshold value.

4. The method of claim 1, further comprising:
determining an image interaction behavior of the user by analyzing the information about the user; and
applying an image processing effect to the other image based on the determined image interaction behavior of the user.

5. The method of claim 4, wherein the applying the image processing effect to the other image comprises:
cropping the other image around the first portion of the other image that depicts the first type of subject corresponding to the at least one interest of the user.

6. The method of claim 4, wherein the applying the image processing effect to the other image comprises:
zooming in on the first portion of the other image that depicts the first type of subject corresponding to the at least one interest of the user.

7. The method of claim 1, wherein the information about the user further comprises at least one type of information selected from a group consisting of user profile data of the user and collaboration data of the user.

8. The method of claim 1, wherein the determining, using the processor, the at least one interest of the user is performed by an interest analyzer executed by the processor.

9. The method of claim 1, wherein the information about the user further comprises data indicating discussion groups in which the user participates in a social networking service.

10. The method of claim 1, wherein the information about the user further comprises collaboration data pertaining to posts in a web based forum the user selects to view.

11. The method of claim 1, wherein the information about the user further comprises data indicating discussion groups in which the user participates in a web based forum.

12. The method of claim 1, wherein the information about the user further comprises data indicating the interest of the user determined based on text messages or e-mails sent or received by the user.

13. The method of claim 1, wherein:
a second portion, of the plurality of portions of the other images, depicts the second type of subject; and
the identifying of the first portion of the other image is based on the ranking of the first type of subject and the second type of subject.

* * * * *